Patented Mar. 14, 1950

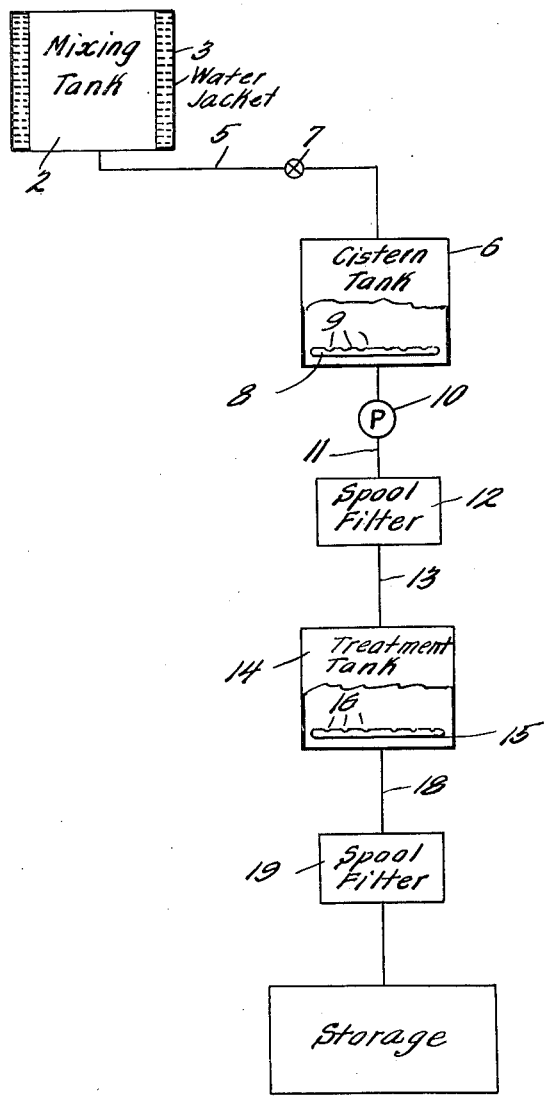

2,500,183

UNITED STATES PATENT OFFICE 2,500,183

PROCESS OF TREATING ALCOHOLIC LIQUORS

David L. Hulsman, Coral Gables, Fla., assignor to Ferd S. Meyer, trustee of the Ferd S. Meyer Puerto Rican Trust, San Juan, Puerto Rico, organized under the laws of Puerto Rico Application May 9, 1946, Serial No. 668,395

12 Claims. (Cl. 99—48)

The present invention relates to the treatment of alcoholic liquor and, more particularly, to the preliminary ageing of green or raw alcoholic liquors.

It is well known that raw alcoholic liquors, in order to be used for beverage or medicinal purposes must be aged for a relatively long period of time in order to eliminate the undesirable constituents thereof and make the liquor palatable for human consumption.

The primary object of the present invention is to preliminarily age raw alcoholic liquors, as for example, rum, and rye and bourbon whiskey, and thereafter complete the ageing of the preliminarily aged raw liquor in the usual manner.

The present invention is particularly applicable to the ageing of a rum distillate produced by the fermentation with yeast of molasses, cane sugar or cane sugar derivatives. However, it is to be distinctly understood that the present invention be not limited to the ageing of rum produced by said process or from said materials.

It is a further object of the present invention to treat the raw alcoholic liquor, as for example, a rum distillate or a whiskey distillate with a mixture of a known alkaline earth metal permanganate and sulfuric acid whereby on reaction of the mixture in the presence of the raw alcoholic liquor, an alkaline earth metal sulfate is produced, said sulfate being insoluble in the alcoholic liquor being treated.

It is another object of the invention to treat the raw alcoholic liquor with a mixture of an alkaline earth metal permanganate and sulfuric acid in which these two constituents are present in at least molecular proportions and, preferably, the proportions are such as to obtain a balanced reaction so that there is no excess of either ingredient, the invention in its best form being practiced so that the alcoholic liquor does not contain any free sulfuric acid.

It is an additional object of the invention to treat the raw alcoholic liquor with a mixture of calcium permanganate and sulfuric acid while inhibiting any substantial vaporization of the raw alcoholic liquor, it being pointed out that the reaction of the alkaline earth metal permanganate and sulfuric acid is highly exothermic.

It is a further object of the invention to utilize a mixture of the alkaline earth metal permanganate and sulfuric acid, or the mixture of the calcium permanganate and sulfuric acid substantially immediately after these ingredients are brought together, and this may be accomplished by preliminarily mixing the ingredients and then treating the raw alcoholic liquor therewith, or these ingredients may be separately added directly to the raw alcoholic liquor, the former procedure being preferred.

It is another object of the present invention in its preferred form to pre-cool the mixture of alkaline earth metal permanganate and sulfuric acid prior to its addition to the raw alcoholic liquor. There is some reaction between these ingredients before their addition to the alcoholic liquor, since permanganic acid is unstable. It has been found that this reaction is highly exothermic and pre-cooling is, therefore desirable.

It is a further object of the present invention to maintain the alcoholic liquor undergoing treatment at a temperature inhibiting any substantial vaporization of the liquor, the latter in the preferred form of the invention being maintained at a temperature below about 85° F.

Another object of the present invention is to carry out the treatment with a mixture of alkaline earth metal permanganate and sulfuric acid as heretofore stated in two periods, one period being the period of active reaction during which the raw liquor is preferably being agitated, and a second and longer period being designated a "quiescent period" in order to facilitate the coagulation of the calcium sulfate and manganese oxide.

It is a further object of the present invention to remove the undesirable compounds produced as a result of treatment of the alkaline earth metal permanganate and sulfuric acid.

A further object of the invention is to subject the so-treated alcoholic liquor to further oxidation after the removal of insoluble compounds, for the purpose of oxidizing undesirable toxic components not removed by the first treatment step, and for converting any inorganic compounds formed during side reactions in the first treatment step into an insoluble state. Also to convert any excess of manganese salt to a manganese oxide or to oxides including manganese dioxide.

The present invention will be described in connection with Figure 1 which diagrammatically sets forth an apparatus suitable for carrying out the present invention.

The present invention will be illustrated by the following specific examples.

Example 1

295 grams of concentrated sulfuric acid of 1.84 specific gravity are mixed with 295 grams of water in a mixing tank 2. There are then added to the mixing tank 1015 grams of calcium permanganate Ca(MnO4)2.4H2O, the temperature of the reaction mixture in the mixing tank 2 being held below about 80° F. or 85° F. in order to inhibit any excessive vaporization of the mixture. The mixing tank is cooled by cooling jacket 3 through which water or any other cooling medium is circulated. It may be stated that the reaction between calcium permanganate and sulfuric acid is an exothermic reaction. Therefore, cooling is required of the mixing tank in which the mixture is formed. The important aspect of the temperature control is to control the temperature of the mixture so that, as stated, there shall be no excessive vaporization. Therefore, it is the upper temperature limit which is limiting and important and not the lower temperature limit. Any desirable lower temperature may be used below which the mixture does not freeze, as for example, minus 50° F.

It is desired to point out that calcium permanganate is a deliquescent and unstable substance or, stated differently, it is a hygroscopic unstable material and, therefore, substantially immediately after the mixture of sulfuric acid, and calcium permanganate has been made, the mixture is passed through the conduit 5 to the cistern tank 6, valve 7 in the line 5 having been opened to allow the mixture to pass to the cistern tank 6 containing a rum distillate as it comes from the distillation columns.

What is desirable is that the reaction between the calcium permanganate and the sulfuric acid take place in the cistern tank, the reaction being substantially as follows:

I. $Ca(MnO_4)_2 \cdot 4H_2O + H_2SO_4 \rightarrow CaSO_4 \cdot 2H_2O + 2HMnO_4$

II. $4HMnO_4 \rightarrow 4MnO_2 + 2H_2O + 3O_2$

The cistern tank 6 contains 4043 wine gallons of 164° proof rum distillate produced from black strap molasses by fermentation with yeast and subsequent distillation.

As is well known the raw rum distillate contains ketones and aldehydes which are of an undesirable nature and which must be eliminated or transformed into compounds which are palatable in order for the alcoholic liquor to be capable of use as a beverage or for medicinal purposes, and this is at least partially accomplished by treating the raw rum distillate with the calcium permanganate-sulfuric acid mixture.

The contents of the cistern tank 6 are maintained at a temperature which will prevent any substantial volatilization of the alcoholic liquor. Here again the temperature should be about 80° F. to 85° F., and the cistern tank 6 may be water-cooled if necessary so that the temperature of the alcoholic liquor does not exceed 80° F. to 85° F.

The so-treated alcoholic liquor in the tank 6 is agitated for a period of about four hours so as to facilitate reaction between the reaction mixture which has been introduced into the tank 6 and the undesirable constituents of the alcoholic liquor. Agitation is preferably accomplished by providing in the tank 6 a sparger coil 8 provided as usual with minute openings 9 through which is introduced atmospheric air under a pressure of 15 to 25 pounds above atmospheric pressure. The amount of pressure used is substantially immaterial as long as the pressure is sufficient to carry the air to the cistern and completely agitate the alcoholic content of the cistern. It has been stated that the treated alcoholic liquor of cistern 6 is allowed to stand for a period of four hours. This period, of course, will vary with the amount of alcoholic liquor being treated, the percentage of undesirable constituents present, the amount of treatment-agent added and other factors; therefore, the period of four hours is to be taken as illustrative, and not by way of limitation.

After a period of about four hours the sparger coil 8 is shut off, and the alcoholic liquor present in the cistern 6 is allowed to come to rest and is maintained in a quiescent condition for a period of about twenty hours. As indicated by Equations I and II, upon the addition of the mixture of calcium permanganate and sulfuric acid to the alcoholic liquor present in the cistern 6, calcium sulfate and some manganese dioxide is precipitated. The function of the quiescent period is to allow the reaction between the undesirable constituents including ketones and aldehydes present in the raw rum distillate and the treatment agent to be completed and to allow the calcium sulfate and the manganese oxide or oxides including any manganese dioxide formed to coagulate; however, here again the period of twenty hours is illustrative and is not to be taken as a limitation. The point is that at this step in the process there must be a period of rest sufficient to allow the precipitated constituents to coagulate and emerge from colloidal suspension. Thereafter, the so-treated alcoholic liquor present in cistern 6 is pumped by means of a pump 10 through the conduit 11 to a suitable filter, as for example, a multiple spool filter 12, said filter functioning to remove the precipitated constituents. From the filter 12 the substantially clear alcoholic liquor is passed by means of the conduit 13 to a second treatment tank 14 which is provided with a sparger coil 15 having the usual openings 16. To the alcoholic liquor, as for example, rum, present in tank 14, there is added hydrogen peroxide, as for example, a 30% solution. After the addition of the hydrogen peroxide the alcoholic liquor in cistern tank 14 is agitated for the purpose of facilitating the reaction between the so-treated partially purified alcoholic liquor and the added hydrogen peroxide. The amount of hydrogen peroxide added to the contents of tank 14 is 18,921 cu. centimeters. The hydrogen peroxide breaks up any remaining excess permanganate salt present in the so-treated liquor to form manganese dioxide and it also breaks up any manganese sulfate which may be present. The hydrogen peroxide also functions to oxidize the undesirable alcohols present in the raw liquors to organic acids which esterify in the presence of alcohols to esters, and undoubtedly also functions to oxidize any aldehydes which remain unoxidized from the previous treatment step. Any manganese sulfate present is soluble, and this material is reduced by the action of the hydrogen peroxide to manganese dioxide, which is insoluble in the alcoholic liquor. The so-treated liquor is passed from tank 14 through the conduit 18 to a suitable filter 19, as for example, a multiple spool filter, and the constituents that have been precipitated in tank 14 are removed. Thereafter the contents of the tank 19 are passed to storage.

The treatment of raw alcoholic liquor, as for example, rum, for the purpose of preliminarily ageing with a mixture of calcium permanganate and sulfuric acid is thought to be a decided advance in the art since it eliminates or materially reduces the presence of soluble metal sulfates in the alcoholic liquor.

The use of the calcium permanganate necessitates the specific process herein set forth including the filtering steps.

It has been proposed to treat raw alcoholic liquors with a mixture of potassium permanganate and sulfuric acid. There is liberated then permanganic acid which is reduced to manganese dioxide, water being simultaneously formed. Side reactions also take place resulting in the formation of manganese sulfate which is soluble and the formation of potassium sulfate which is soluble. If hydrogen peroxide is added to the so-treated raw alcoholic liquor, as for example, rum, it is doubtful whether substantially any further oxidation occurs. What does occur is a partial conversion of potassium sulfate to potassium hydroxide and possibly the conversion of the manganese sulfate to manganese hydroxide; however, there does remain in solution undesirable potassium sulfate and some manganese salts, including manganese sulfate. It is undesirable to have even a small amount of potassium sulfate present in the rum distillate.

In accordance with the present invention, utilizing a mixture of calcium permanganate and sulfuric acid, the formation of soluble salts derived from the permanganate is avoided. However, since calcium permanganate is highly deliquescent and is a fairly unstable compound, it becomes necessary to use the mixture of calcium permanganate and sulfuric acid substantially immediately after it is made.

It is further desired to point out that if the reaction mixture comprises a mixture of potassium permanganate and sulfuric acid, it is extremely doubtful if any further oxidation takes place when hydrogen peroxide is added after the alcoholic liquor has been preliminarily treated with a mixture of potassium permanganate and sulfuric acid. At the most there is possibly a dissolving of potassium sulfate precipitate and possibly the conversion of manganese sulfate to manganese hydroxide.

When the mixture of calcium permanganate and sulfuric acid is added to the raw alcoholic liquor, there is a reaction between the calcium permanganate and the sulfuric acid to form calcium sulfate which is insoluble and permanganic acid, the latter being further reduced to manganese oxide or oxides including any manganese dioxide formed, and water with the corresponding oxidation of the ketones and aldehydes to alcohols. Thereafter, by filtration the calcium sulfate and the manganese dioxide or oxide which is insoluble in water and in the so-treated rum distillate are removed.

When to the so-treated raw alcoholic liquor, as for example, a rum distillate, a 30% solution of hydrogen peroxide is added, there is a secondary oxidation reaction. Part of the alcohols are oxidized to organic acids which esterify in the presence of alcohols to esters, and, undoubtedly, there is further oxidation of any aldehydes remaining unoxidized upon the addition of the mixture of calcium permanganate and sulfuric acid to the raw alcoholic liquor. Also there is a precipitation of any excess calcium permanganate and any insoluble oxide or oxides of manganese including manganese dioxide. The second filtration step heretofore set forth functions to accomplish the removal of the remaining quantities of manganese oxide, or oxides thereby accomplishing the removal during the two treatment steps of all materials added, but at the same time changing the character of the original distillate through oxidation of ketones and aldehydes and esterification as above set forth.

*Example II*

The rum distillate is treated in accordance with the method set forth in Example 1 except the quantities of rum distillate and treatment agents are as follows:

Wine gallons of rum at 164° proof treated— 10,475.

766 gms. of sulfuric acid of 1.84 specific gravity are mixed with 766 gms. of water, and there is then added to the diluted sulfuric acid 2,629 gms. of calcium permanganate. At the appropriate point in the process, as set forth in Example I, 49,023 cubic centimeters of 30% hydrogen peroxide is added.

*Example III*

582 gms. of sulfuric acid of 1.84 specific gravity are mixed with 582 gms. of water. To the diluted sulfuric acid, there is added 2000 gms. of calcium permanganate. The entire mixture is then substantially immediately added to 7,963 wine gallons of rum distillate having a proof of 164°, said rum distillate containing impurities to be removed or transformed by the treatment specified. Thereafter, there is added at the appropriate point of the process as set forth in Example I, 37,262 cubic centimeters of 30% hydrogen peroxide.

*Example IV*

145 gms. of sulfuric acid of 1.84 specific gravity are mixed with 145 gms. of water. To the reaction-mixture is added 500 gms. of calcium permanganate. Substantially immediately after the mixture is made, it is added to 1991 gms. of raw rum distillate having a proof of 164°. There was added at the appropriate point in the process, as set forth in Example I, 9,318 cubic centimeters of 30% hydrogen peroxide.

*Example V*

592 gms. of sulfuric acid of 1.84 specific gravity are mixed with 592 gms. of water to provide a diluted sulfuric acid, and there are added thereto 2,033 gms. of calcium permanganate. The mixture is added substantially immediately to 8,099 wine gallons of raw rum distillate having a proof of 164°. At the appropriate point in the process as set forth in Example I, there are added 37,903 cu. centimeters of 30% hydrogen peroxide.

If the above figures are translated into percentages by weight taken on the weight of the rum distillate, these percentages will be the same as herein generally set forth.

In preparing the mixture of calcium permanganate and sulfuric acid, it is desirable to use calcium permanganate and sulfuric acid in molecular proportions calculated to obtain a balanced reaction so there will be no excess of either ingredient. However, an excess of calcium permanganate would be more desirable than any excess of sulfuric acid. If the two agents added are not used in balanced proportions, it is likely that free sulfuric acid might remain in the distillate which would, of course, be considered deleterious to the consumers' well-being. In other words, it is certainly desirable that the reaction mixture be free of free sulfuric acid, and it is likewise desirable that it be free of calcium permanganate although it can contain some excess of calcium permanganate since it has already been shown that any excess of this compound is eliminated through treatment with hydrogen peroxide.

The amount of the mixture of the sulfuric acid and calcium permanganate added to the raw rum distillate is just sufficient to accomplish substantially complete neutralization and elimination of the materials added.

In general, the quantities of the treatment-addition agents may be varied depending upon the character of the distillate to be treated; that is, depending on the quantities of aldehydes and other undesirable ingredients present in the distillate; however, in no case should less than about .0015% of sulfuric acid of 1.84 specific gravity of calcium permanganate be added to the raw distillate, said percentages being by weight on the raw distillate. In general, the amount of 30% hydrogen peroxide added should not be less than .09% taken on the weight of the distillate. Of course, as the strength of the hydrogen peroxide is changed this percentage figure will change, but the equivalent percentage can be calculated from the figures herein set forth. These minimum percentages are set forth as representing the smallest quantities that will effect the desired reaction. In general, it may be stated that it is undesirable to use greater quantities than .005% of sulfuric acid of 1.84 specific gravity, or an equivalent amount of sulfuric acid of equivalent strength, .018% of calcium permanganate and .30% of 30% hydrogen peroxide for the reason that the greater quantities lead to exaggerated side reactions producing undesirable ingredients, and it is substantially impossible to inhibit or limit such side reactions. In other words, the limiting percentages herein set forth are fairly critical.

Referring to Example I, the amount of addition agents added may be expressed in percentage form taken on the weight of the rum distillate and, when so expressed, are as follows:

|  | Per cent |
|---|---|
| Sulfuric acid | .0026 |
| Calcium permanganate | .0090 |
| 30% hydrogen peroxide | .17 |

Instead of agitating the rum distillate with air, it may be agitated with oxygen enriched air or pure oxygen.

Instead of using calcium permangenate, there may be used other alkaline earth permanganates such as barium and strontium permanganates. Such other compounds are not preferred because of solubility constants or for other reasons.

While in the specific example set forth the sulfuric acid is stated to have a specific gravity of 1.84 and this gives the preferred results, it is desired to point out that sulfuric acid of other concentrations may be used. It is preferable that the sulfuric acid be concentrated sulfuric acid. In Hackh's Chemical Dictionary, 1944, page 822, it is stated that sulfuric acid having a specific gravity of 1.84 represents 94% of concentrated sulfuric acid. If the specific gravity is 1.826, the acid is 92.5% concentrated sulfuric acid. If the sulfuric acid has a specific gravity of 1.8542, then the concentration thereof is 98.1. Any sulfuric acid of these concentrations or equivalent concentrations may be used, and even oleum may be used.

I claim:
1. The method of preliminarily ageing raw alcoholic liquor containing undesirable components including aldehydes comprising forming a mixture of deliquescent calcium permanganate and sulfuric acid in at least molecular proportions while inhibiting substantial vaporization of the mixture, adding the latter before there is any substantial reaction between the components to the raw alcoholic liquor so that the reaction therebetween occurs in the presence of said liquor to thereby oxidize certain of the components present in the liquor, there being produced as a result of the reaction calcium sulfate insoluble in the alcoholic liquor and unstable permanganic acid which breaks down to produce a manganese oxide insoluble in the alcoholic liquor, removing from the alcoholic liquor the insoluble calcium sulfate and manganese oxide, treating the so-conditioned alcoholic liquor with an oxidizing agent to oxidize organic components present in the liquor and any inorganic compounds produced as a result of side reactions during the first treatment step, and removing from the so-oxidized liquor the precipitated constituents.

2. The method of preliminarily ageing raw alcoholic liquor containing undesirable components including aldehydes comprising forming a mixture of deliquescent calcium permanganate and sulfuric acid in proportions to precipitate in the liquor calcium sulfate and a manganese oxide while inhibiting substantial vaporization of the mixture, adding the latter before there is any substantial reaction between the components to the raw alcoholic liquor so that the reaction therebetween occurs in the presence of said liquor to thereby oxidize certain of the components present in the liquor, and produce calcium sulfate insoluble in the alcoholic liquor and unstable permanganic acid which breaks down to produce a manganese oxide insoluble in the alcoholic liquor, removing from the alcoholic liquor the insoluble calcium sulfate and manganese oxide, treating the so-conditioned alcoholic liquor with hydrogen peroxide to oxidize organic components present in the liquor and any inorganic compounds produced as a result of side reactions during the first treatment step, and removing from the so-oxidized liquor the precipitated constituents.

3. The method of preliminarily ageing raw alcoholic liquor containing undesirable components including aldehydes comprising forming a mixture of deliquescent calcium permanganate and sulfuric acid in at least molecular proportions while inhibiting any substantial vaporization of the mixture, adding said mixture before there is any substantial reaction between the components to the raw alcoholic liquor, agitating said raw alcoholic liquor in the presence of said mixture to facilitate reaction between the treatment agent and the undesirable components of the raw alcoholic liquor, there being produced calcium sulfate and a manganese oxide insoluble in said liquor, terminating said agitation, keeping the so-treated alcoholic liquor in a quiescent state to coagulate the calcium sulfate and manganese oxide, removing the insoluble calcium sulfate and manganese oxide, treating the so-conditioned alcoholic liquor with an oxidizing agent to oxidize additional organic components present in the liquor and any inorganic compounds produced as a result of side reactions during the first treatment step, and removing from the so-oxidized liquor the precipitated constituents.

4. The method of preliminarily ageing raw alcoholic liquor containing undesirable components including aldehydes comprising forming a mixture of deliquescent calcium permanganate and sulfuric acid in proportions to precipitate calcium sulfate and manganese oxide while inhibiting any substantial vaporization of the mixture, adding said mixture before there is any substantial reaction between the components to the raw alcoholic liquor, agitating said raw alcoholic liquor in the presence of said mixture to facilitate reaction between the treatment agent and the undesirable components of the raw alcoholic liquor, there being precipitated in the liquor calcium sulfate and a manganese oxide insoluble in said liquor, terminating said agitation, keeping the so-treated alcoholic liquor in a quiescent state to coagulate the calcium sulfate and manganese oxide, removing the insoluble calcium sulfate and manganese oxide, treating the so-conditioned alcoholic liquor with hydrogen peroxide to oxidize additional organic components present in the liquor and any inorganic compounds produced as a result of side reactions during the first treatment step, and removing from the so-oxidized liquor the precipitated constituents.

5. The method of preliminarily ageing raw alcoholic liquor containing undesirable components including aldehydes, said liquor being maintained at a temperature inhibiting vaporization thereof comprising treating said alcoholic liquor with a mixture of calcium permanganate and sulfuric acid in proportions to produce calcium sulfate and a manganese oxide, agitating said raw alcoholic liquor in the presence of said mixture to facilitate reaction between the treatment agent and the undesirable components of the raw alcoholic liquor, there being precipitated in the liquor calcium sulfate and a manganese oxide insoluble in said liquor, terminating said agitation, keeping the so-treated alcoholic liquor in a quiescent state to coagulate the calcium sulfate and manganese oxide, removing the insoluble calcium sulfate and manganese oxide, treating the so-conditioned alcoholic liquor with an oxidizing agent to oxidize additional organic components present in the liquor and any inorganic compounds produced as a result of side reactions during the first treatment step, and removing from the so-oxidized liquor the precipitated constituents.

6. The method of preliminarily ageing raw alcoholic liquor containing undesirable components including aldehydes, said liquor being maintained at a temperature inhibiting vaporization thereof comprising treating said alcoholic liquor with a mixture of calcium permanganate and sulfuric acid in proportions to precipitate in the liquor calcium sulfate and a manganese oxide, agitating said raw alcoholic liquor in the presence of said mixture to facilitate reaction between the treatment agent and the undesirable components of the raw alcoholic liquor, there being precipitated in the liquor calcium sulfate and a manganese oxide insoluble in said liquor, terminating said agitation, keeping the so-treated alcoholic liquor in a quiescent state to coagulate the calcium sulfate and manganese oxide, removing the insoluble calcium sulfate and manganese oxide, treating the so-conditioned alcoholic liquor with hydrogen peroxide to oxidize additional organic components present in the liquor and any inorganic compounds produced as a result of side reactions during the first treatment step, and removing from the so-oxidized liquor the precipitated constituents.

7. The method of preliminarily ageing raw alcoholic liquor containing undesirable compounds, said liquor being maintained in a liquid state and at a temperature below about 85° F. comprising treating said alcoholic liquor with a mixture of calcium permanganate and sulfuric acid in proportions to produce calcium sulfate and a manganese oxide, agitating said raw alcoholic liquor in the presence of said mixture to facilitate reaction between the treatment agent and the undesirable components of the raw alcoholic liquor, there being precipitated in the liquor calcium sulfate and a manganese oxide insoluble in said liquor, terminating said agitation, keeping the so-treated alcoholic liquor in a quiescent state to coagulate the calcium sulfate and manganese oxide, removing the insoluble calcium sulfate and manganese oxide, treating the so-conditioned alcoholic liquor with an oxidizing agent to oxidize additional organic components present in the liquor and any inorganic compounds produced as a result of side reactions during the first treatment step, and removing from the so-oxidized liquor the precipitated constituents.

8. The method of preliminarily ageing raw alcoholic liquor containing undesirable compounds, said liquor being maintained in a liquid state and at a temperature below about 85° F. comprising treating said alcoholic liquor with a mixture of calcium permanganate and sulfuric acid in proportions to produce calcium sulfate and a manganese oxide, agitating said raw alcoholic liquor in the presence of said mixture to facilitate reaction between the treatment agent and the undesirable components of the raw alcoholic liquor, there being produced calcium sulfate and a manganese oxide insoluble in said liquor, terminating said agitation, keeping the so-treated alcoholic liquor in a quiescent state to coagulate the calcium sulfate and manganese oxide, removing the insoluble calcium sulfate and manganese oxide, treating the so-conditioned alcoholic liquor with hydrogen peroxide to oxidize additional organic components present in the liquor and any inorganic compounds produced as a result of side reactions during the first treatment step, and removing from the so-oxidized liquor the precipitated constituents.

9. The method of preliminarily ageing raw alcoholic liquor containing undesirable components including aldehydes, said liquor being maintained at a temperature inhibiting vaporization thereof comprising treating said alcoholic liquor with a mixture of an alkaline earth metal permanganate and sulfuric acid in proportions to precipitate in the liquor an alkaline earth metal sulfate and a manganese oxide, agitating said raw alcoholic liquor in the presence of said mixture to facilitate reaction between the treatment agent and the undesirable components of the raw alcoholic liquor, there being precipitated in the liquor an alkaline earth metal sulfate and a manganese oxide insoluble in said liquor, terminating said agitation, keeping the so-treated alcoholic liquor in a quiescent state to coagulate the alkaline earth metal sulfate and manganese oxide, removing the insoluble alkaline earth metal sulfate and manganese oxide, treating the so-conditioned alcoholic liquor with an oxidizing agent to oxidize additional organic components present in the liquor and any inorganic compounds produced as a result of side reactions during the first treatment step, and removing from the so-oxidized liquor the precipitated constituents.

10. The method of preliminarily ageing raw alcoholic liquor containing undesirable compounds comprising treating said alcoholic liquor with a mixture of calcium permanganate and sulfuric acid, the amount of calcium permanganate present being equivalent to between .0050% and .018% expressed as Ca(MnO₄)₂.4H₂O, and the amount of sulfuric acid being equivalent to between .0015% and .0050% expressed as sulfuric acid having a specific gravity of 1.84, said mixture functioning to oxidize certain components present in the liquor, there being produced as a result of the reaction calcium sulfate and a manganese oxide insoluble in the alcoholic liquor, removing from the alcoholic liquor the insoluble calcium sulfate and manganese oxide, treating the so-conditioned alcoholic liquor with an oxidizing agent to oxidize organic components present in the liquor and any inorganic compounds produced as a result of side reactions during the first treatment step, and removing from the so-oxidized liquor the precipitated constituents.

11. The method of preliminarily ageing raw alcoholic liquor containing undesirable compounds comprising treating said alcoholic liquor with a mixture of calcium permanganate and sulfuric acid, the amount of calcium permanganate present being equivalent to between .0050% and .018% expressed as Ca(MnO₄)₂.4H₂O, and the amount of sulfuric acid being equivalent to between .0015% and .0050% expressed as sulfuric acid having a specific gravity of 1.84, said mixture functioning to oxidize certain components present in the liquor, there being produced as a result of the reaction calcium sulfate and a manganese oxide insoluble in the alcoholic liquor, removing from the alcoholic liquor the insoluble calcium sulfate and manganese oxide, treating the so-conditioned alcoholic liquor with hydrogen peroxide to oxidize additional organic components present in the liquor and any inorganic compounds produced as a result of side reactions during the treatment step, and removing from the so-oxidized liquor the precipitated constituents, the amount of hydrogen peroxide added being equivalent to between .09% and .30% of 30% hydrogen peroxide.

12. The method of preliminarily ageing raw alcoholic liquor containing undesirable components including aldehydes, said liquor being maintained at a temperature inhibiting vaporization thereof, comprising treating said alcoholic liquor with a mixture of calcium permanganate and sulfuric acid, the amount of calcium permanganate being equivalent to between .0050% and .018% expressed as Ca(Mn₄O)₂.4H₂O, and the amount of sulfuric acid being equivalent to between .0015% and .0050% expressed as sulfuric acid, having a specific gravity of 1.84, agitating said raw alcoholic liquor in the presence of said mixture to facilitate reaction between the treatment agent and the undesirable components of the raw alcoholic liquor, there being produced calcium sulfate and a manganese oxide insoluble in said liquor, terminating said agitation, keeping the so-treated alcoholic liquor in a quiescent state to coagulate the calcium sulfate and manganese oxide, removing the insoluble calcium sulfate and manganese oxide, treating the so-conditioned alcoholic liquor with hydrogen peroxide to oxidize additional components in the liquor and any inorganic compounds produced as a result of side reactions during the treatment step, and removing from the so-oxidized liquor the precipitated constituents, the amount of hydrogen peroxide being equivalent to between .09% and .30% of 30% hydrogen peroxide.

DAVID L. HULSMAN.

REFERENCES CITED

The following references are of record in the file of this patent:

UNITED STATES PATENTS

| Number | Name | Date |
| --- | --- | --- |
| 485,341 | Cushing | Nov. 1, 1892 |
| 666,535 | Lavollay et al. | Jan. 22, 1901 |
| 706,075 | Lubberger | Aug. 5, 1902 |
| 1,963,165 | Gosch | June 19, 1934 |
| 2,054,006 | Shoeld | Sept. 8, 1936 |
| 2,096,334 | Merriam | Oct. 19, 1937 |

OTHER REFERENCES

"Beverages and Their Adulteration," by H. W. Wiley, published by P. Blakiston's Son & Co., Philadelphia, Pa., 1919, pages 53, 54.

"Disinfection and the Preservation of Food," by S. Rideal, published by John Wiley & Sons, New York, 1903, pages 168 to 170, 381, 405, 406, 474, 475.